(12) United States Patent
Hendler et al.

(10) Patent No.: US 7,313,454 B2
(45) Date of Patent: Dec. 25, 2007

(54) METHOD AND APPARATUS FOR CLASSIFYING MANUFACTURING OUTPUTS

(75) Inventors: Lawrence Hendler, Cupertino, CA (US); Matthew Richter, Woodside, CA (US)

(73) Assignee: MKS Instruments, Inc., Wilmington, MA (US)

( * ) Notice: Subject to any disclaimer, the term of this patent is extended or adjusted under 35 U.S.C. 154(b) by 8 days.

(21) Appl. No.: 11/292,485

(22) Filed: Dec. 2, 2005

(65) Prior Publication Data

US 2007/0129836 A1 Jun. 7, 2007

(51) Int. Cl.
*G06F 19/00* (2006.01)
*G06F 1/00* (2006.01)

(52) U.S. Cl. .................... 700/110; 700/73; 702/179

(58) Field of Classification Search .............. 700/73, 700/101, 110; 702/179, 182, 183, 185
See application file for complete search history.

(56) References Cited

U.S. PATENT DOCUMENTS

| | | | |
|---|---|---|---|
| 5,442,562 A | 8/1995 | Hopkins et al. | 364/468 |
| 5,479,340 A | 12/1995 | Fox et al. | 364/153 |
| 5,544,256 A | 8/1996 | Brecher et al. | 382/149 |
| 6,153,115 A | 11/2000 | Le et al. | 216/60 |
| 6,336,082 B1 * | 1/2002 | Nguyen et al. | 702/179 |
| 6,442,445 B1 | 8/2002 | Bunkofske et al. | 700/108 |
| 6,453,246 B1 * | 9/2002 | Agrafiotis et al. | 702/27 |
| 6,456,899 B1 | 9/2002 | Gleason et al. | 700/212 |
| 6,830,939 B2 | 12/2004 | Harvey et al. | 438/8 |
| 6,839,655 B2 * | 1/2005 | Gross et al. | 702/179 |
| 6,917,839 B2 * | 7/2005 | Bickford | 700/30 |
| 6,967,899 B1 * | 11/2005 | O'Brien et al. | 367/131 |
| 2004/0055888 A1 | 3/2004 | Wikiel et al. | 205/81 |
| 2004/0083065 A1 | 4/2004 | Daniel et al. | 702/35 |
| 2004/0116814 A1 | 6/2004 | Stranc et al. | 600/473 |
| 2004/0228186 A1 | 11/2004 | Kadota | 365/202 |
| 2005/0028932 A1 | 2/2005 | Shekel et al. | 156/345.15 |
| 2005/0037515 A1 | 2/2005 | Nicholson et al. | 436/173 |
| 2005/0045821 A1 | 3/2005 | Noji et al. | 250/311 |
| 2005/0130321 A1 | 6/2005 | Nicholson et al. | 436/518 |

OTHER PUBLICATIONS

Goodlin et al., "Simultaneous Fault Detection and Classification for Semiconductor Manufacturing Tools," 201st Meeting of the Electrochemical Society, International Symposium on Plasma Processing XIV, Abs. 413, Philadelphia, PA, May 2002 (16 pages).

Goodlin et al., "Simultaneous Fault Detection and Classification for Semiconductor Manufacturing Tools," Journal of the Electrochemical Society, 150 (12) G778-G784 (2003).

(Continued)

*Primary Examiner*—Leo Picard
*Assistant Examiner*—Douglas S Lee
(74) *Attorney, Agent, or Firm*—Proskauer Rose LLP

(57) ABSTRACT

A method for process monitoring involves acquiring data samples associated with a plurality of manufacturing related variables for a plurality of outputs of a manufacturing process. The distance of each data sample relative to every other data sample is then calculated. The outputs are then grouped based on the Euclidean distances that satisfy a boundary determining criterion.

20 Claims, 2 Drawing Sheets

OTHER PUBLICATIONS

Gallagher et al., "Development and Benchmarking of Multivariate Statistical Process Control Tools for a Semiconductor Etch Process: Improving Robustness through Model Updating," Eigenvector Research, Inc., (6 pgs.) first viewed at least Sep. 9, 2004.

Chen et al., "Plasma Etch Modeling using Optical Emission Spectroscopy," J. Vac. Sci. Technol. A 14(3), May/Jun. 1996 (pp. 1901-1906).

Lymberopoulos et al., "Advanced Process Control Comes of Age," Jul. 1, 2004 http://www.reed-electronics.com/semiconductor/index.asp?layout=articlePrint&article ID=... (pp. 1-6).

Skumanich et al., "Advanced Etch Applications Using Tool-Level Data," Copyright 2005, PennWell Corporation, http://sst.pennet.com/articles/article_display.cfm?section=archi&article_id=206470&vers..., Jun. 2004 (pp. 1-7).

Mason et al., "Applying Hotelling's $T^2$ Statistic to Batch Processes," Journal of Quality Technology, vol. 33, No. 4, Oct. 2001 (pp. 466-479).

Smith et al., "Process Leaps Without New Hardware," European Semiconductor, The Source for Europe, Middle East and Africa, www.euroseml.eu.com, Nov. 2004 (4 pages).

"TOOLweb Blue Box Professional: Enabling High Speed, Multi-User Connectivity and Data Sharing," Control & Information Technology, www.mksinst.com, Mar. 2005 (4 pages).

"TOOLweb SenseLink: Web-Enables Existing Sensors," Control & Information Technology, www.mksinst.com, Dec. 2004 (4 pages).

"TOOLweb: APC & e-Diagnostics Suite," Control & Information Technology, www.mksinst.com, Nov. 2004 (4 pages).

"TOOLweb Applications Support: AEC/APC Applications Engineering, Integration and Deployment Support," Control & Information Technology, www.mksinst.com, Sep. 2005 (4 pages).

Smith et al., "From Sensor Data to Process Control: A Networked Framework," Semiconductor Manufacturing Magazine, Jul. 2004 (6 pages).

Wold et al., "Modeling and Diagnostics of Batch Processes and Analogous Kinetic Experiments," Chemometrics and Intelligent Laboratory Systems 44 (1998) (pp. 331-340).

* cited by examiner

METHOD AND APPARATUS FOR CLASSIFYING MANUFACTURING OUTPUTS

FIELD OF THE INVENTION

The present invention relates to methods and apparatus for process monitoring and, more specifically, classifying outputs of manufacturing processes.

BACKGROUND OF THE INVENTION

Historically, semiconductor device manufacturers have managed the transition to tighter process/materials specifications by depending on process tool manufacturers to design better and faster process/hardware configurations. As device geometries shrink to the nanometer scale, however, the increasing complexity of manufacturing processes has changed the landscape that must be negotiated to meet and maintain process/materials specifications.

A typical process tool used today in semiconductor manufacturing is described by a set of several thousand variables. In some cases, of these several thousand variables, there will be several hundred relevant dynamic variables. The dynamic variables (e.g., gas flow, gas pressure, delivered power, current, voltage) change based on, for example, the specific processing recipe, the step in the overall set of processing steps, or errors or faults occurring in the manufacturing process.

By way of example, if a given semi wafer manufacturing process has 200 dynamic variables that are each sampled by a data acquisition system at a rate of one sample per second (or faster) and a wafer requires 30 seconds to process, the data acquisition system will acquire 6000 data points (or more). It is quite difficult for an operator to look at the raw data traces plotted on a screen for each of the 200 variables to determine if, for example, the process is progressing properly or if a fault has occurred that would cause a defect in a specific wafer.

Meaningful application of this potential flood of data in process control is a formidable task. Simpler approaches, such as univariate statistical process control (USPC), are well established, but have limitations. USPC is effective in the observation and control of a single response parameter but advanced device fabrication requires control of multiple manufacturing variables simultaneously. Manufacturing variables typically have complex interrelationships that USPC can neither evaluate nor control.

A need therefore exists for improved systems and methods for detecting and classifying defects associated with manufacturing processes and outputs of the manufacturing processes.

SUMMARY OF THE INVENTION

The present invention features methods for process monitoring. More particularly, the present invention features methods for classifying detected faults of manufacturing processes.

The invention, in one aspect, features a method for process monitoring. The method involves acquiring data samples associated with a plurality of manufacturing related variables for outputs of a manufacturing process (for example, a semiconductor manufacturing process). The method also involves calculating the distance (e.g., Euclidean distance) of each data sample relative to every other data sample. The method also involves grouping outputs based on the distances that satisfy a boundary determining criterion.

In some embodiments, the boundary determining criterion involves grouping data samples (e.g., measurements) located within a predefined distance relative to each other. The boundary defining criterion can be selected by a user. The predefined distance can be based on an analytical, experimental, or empirical model. In some embodiments, the method for process monitoring also involves associating a classification with a group (e.g., measurement group). In some embodiments, the classification associated with the group is a manufacturing defect. In some embodiments, the distance is calculated by the Mahalanobis distance method or the Manhattan distance method.

In some embodiments, the method also involves plotting the plurality of data samples as points in a phase space. In some embodiments, calculating the distance involves calculating the Euclidean distance of each point in phase space relative to every other point in phase space. In some embodiments, the plurality of manufacturing related variables represent one or more states of the manufacturing process.

In some embodiments, the method also involves computing mathematical transformations of the data acquired for each output. In some embodiments, computing mathematical transformations involves computing principal components and loadings associated with the data acquired for each measurement. In some embodiments, the method also involves calculating the distance of each data sample relative to every other data samples based on the mathematical transformations.

In some embodiments, the outputs of the manufacturing process are wafers produced by a semiconductor manufacturing process. The method also can involve identifying the classification of outputs of a manufacturing process based on the Euclidean distance of a data sample associated with the manufacturing sample relative to the groups. The method also can involve grouping the groups themselves, based on whether the groups have common characteristics. The method also can involve developing a model for predicting the group associated with a new manufacturing output based on calculating the distance of the new manufacturing output relative to the distances associated with each of the groups. In some embodiments, the method also involves modifying the boundary determining criterion based on new manufacturing outputs.

In another aspect, the invention features a system for process monitoring. The system includes means for acquiring data samples associated with a plurality of manufacturing related variables for outputs of a manufacturing process. The system also includes means for calculating the distance of each data sample relative to every other data sample. The system also includes means for grouping outputs based on the distances that satisfy a boundary determining criterion.

BRIEF DESCRIPTION OF THE DRAWINGS

The foregoing and other objects feature and advantages of the invention, as well as the invention itself, will be more fully understood from the following illustrative description, when read together with the accompanying drawings which are not necessarily to scale.

DETAILED DESCRIPTION OF ILLUSTRATIVE EMBODIMENTS

Figure 1:
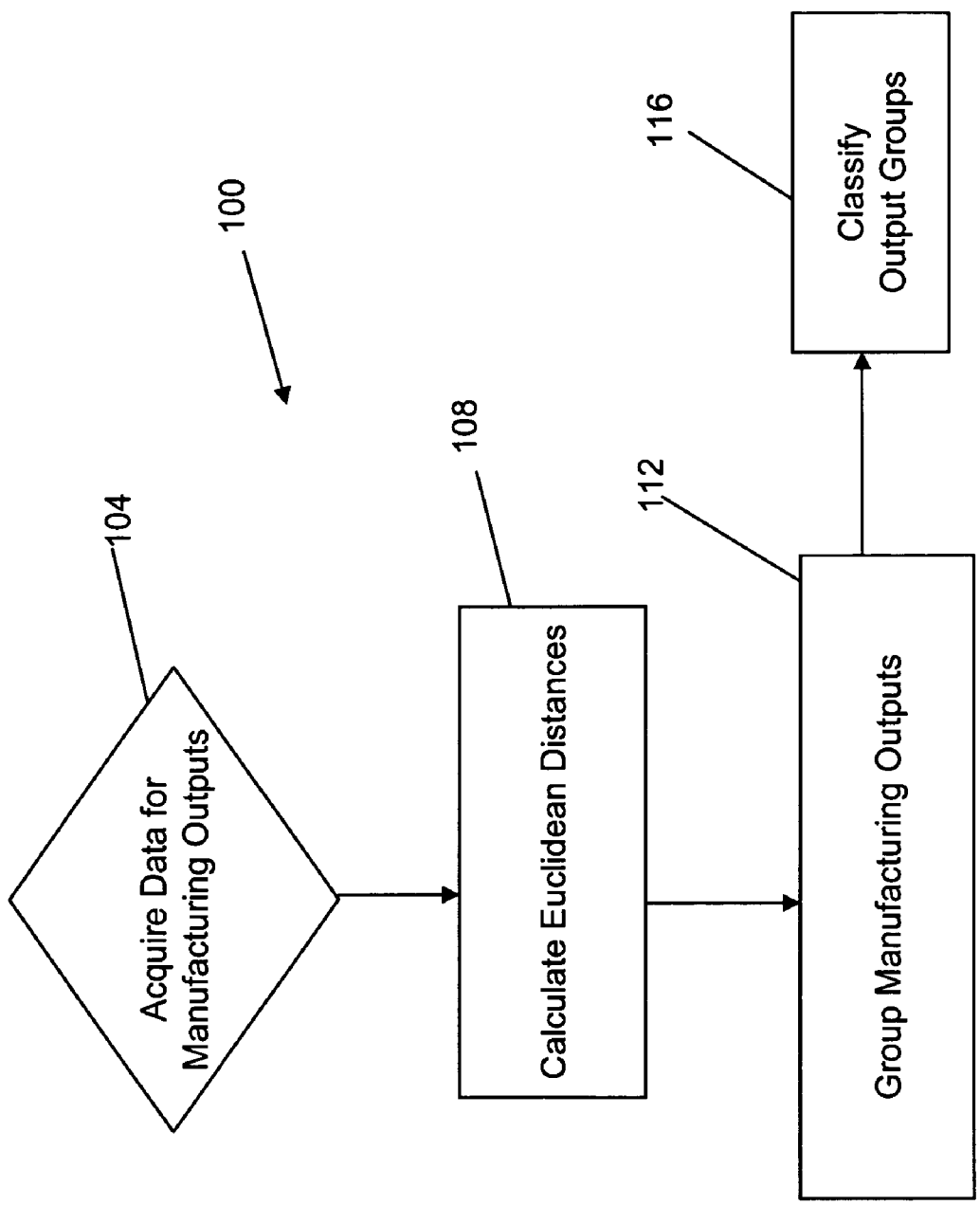
FIG. 1 is a flow diagram of a method for process monitoring and grouping outputs of the process, according to an illustrative embodiment of the invention.

FIG. 1 is a flow diagram 100 of a method for process monitoring. In this embodiment, the method involves acquiring data samples (step 104) associated with a plurality of manufacturing related variables (e.g., variables associated with manufacturing tools, processes, internal, and external sensors) for a plurality of outputs of a manufacturing process. The method can be implemented with, for example, a computer processor or personal computer. In some embodiments, the outputs of the manufacturing process are wafers produced by a semiconductor manufacturing process.

In some embodiments, the manufacturing related variables are one or more states of the manufacturing process. Manufacturing related variables may include, for example, gas flow, gas pressure, gas valve position, gas temperature, coolant temperature, delivered power, reflected power, current, voltage, capacitance, resistance, inductance and impedance. Data for manufacturing related variables may be acquired using, for example, one or more sensors (e.g., process sensor, residual gas analyzer, optical emission spectrometer, Fourier transform infrared spectrometer, VI probe, particle counter, gas flow monitor, gas pressure monitor, temperature gage, and self excited electron resonance spectrometer). In one embodiment, the manufacturing process involves removing photoresist material from the surface of semiconductor wafers as a step in a semiconductor processing procedure. In this embodiment, the method of the invention described with respect to FIG. 1 is used to group wafers produced by the manufacturing procedure into different classes of wafers (e.g., wafers with photoresist and wafers without photoresist).

The next step in the flow diagram 100 involves calculating (step 108) the distances (e.g., Euclidean distances) of each data sample relative to every other data sample. In one embodiment, the distances are Euclidean distances and are calculated using EQN. 1.

$$D = \sqrt{\left(\sum_{i=1}^{N}(a_i - b_i)^2\right)} \qquad \text{EQN. 1}$$

where D is the distance between two points (a and b) in N dimensional space.

By way of example, in a case where a and b are points in three-dimensional space, a has the coordinates $(a_1,a_2,a_3)$, b has the coordinates $(b_1,b_2,b_3)$, and the distance between a and b is given by:

$$D = \sqrt{(a_1-b_1)^2 + (a_2-b_2)^2 + (a_3-b_3)^2} \qquad \text{EQN. 2}$$

The next step in the flow diagram 100 involves grouping the data samples (step 112) based on the Euclidean distances that satisfy a boundary determining criterion. In some embodiments, the boundary determining criterion involves grouping those data samples that are located within a predefined distance relative to each other. In some embodiments, the boundary defining criterion is selected by a user. In some embodiments, the boundary determining criterion (e.g., grouping those data samples that are located within a predefined distance relative to each other) is based on an analytical, experimental, or empirical model.

Alternative methods for determining distances can be used to calculate the distance of each data sample relative to every other data sample. By way of example, in some embodiments, Mahalanobis distance can be calculated for each data sample relative to every other data sample.

$$D = \sqrt{(a-b)^t S^{-1}(a-b)} \qquad \text{EQN. 3}$$

where $S^{-1}$ is the covariance matrix and where:

$$D = \|a\| = \sqrt{a^t S^{-1} a} \qquad \text{EQN. 4}$$

is the norm of a.

The next step in the flow diagram 100 involves associating a classification (step 116) with one or more of the groups defined in step 112. In some embodiments, the classification can be a desirable or undesirable trait or feature of the manufacturing output. In some embodiments, classifying the groups (step 116 can involve classifying a specific group as a manufacturing defect.

By way of example, experimental data can be used to identify outputs of a manufacturing process that have a common fault. In this manner, a user can identify the average distance between those data points that characterize this common fault. The average distance can then be used to define the boundary criterion for the group characterizing the common fault. Each new output of the manufacturing process can then be evaluated using steps 108, 112, and 116. If the distance between the new data samples and those located within the group characterizing the common fault satisfies the boundary determining criterion (having a distance less than the average distance previously determined for the group), the new output is classified as a member of that group.

Alternative schemes may be used to group manufacturing outputs. For example, the weighted average of the distance between data samples can be used to define a boundary criterion for a group. In some embodiments there may be two or more groups identified in the data samples evaluated. Each group may possess different characteristics. The characteristics may be associated with, for example, various fault conditions and/or performance properties of the manufacturing outputs.

Figure 2:
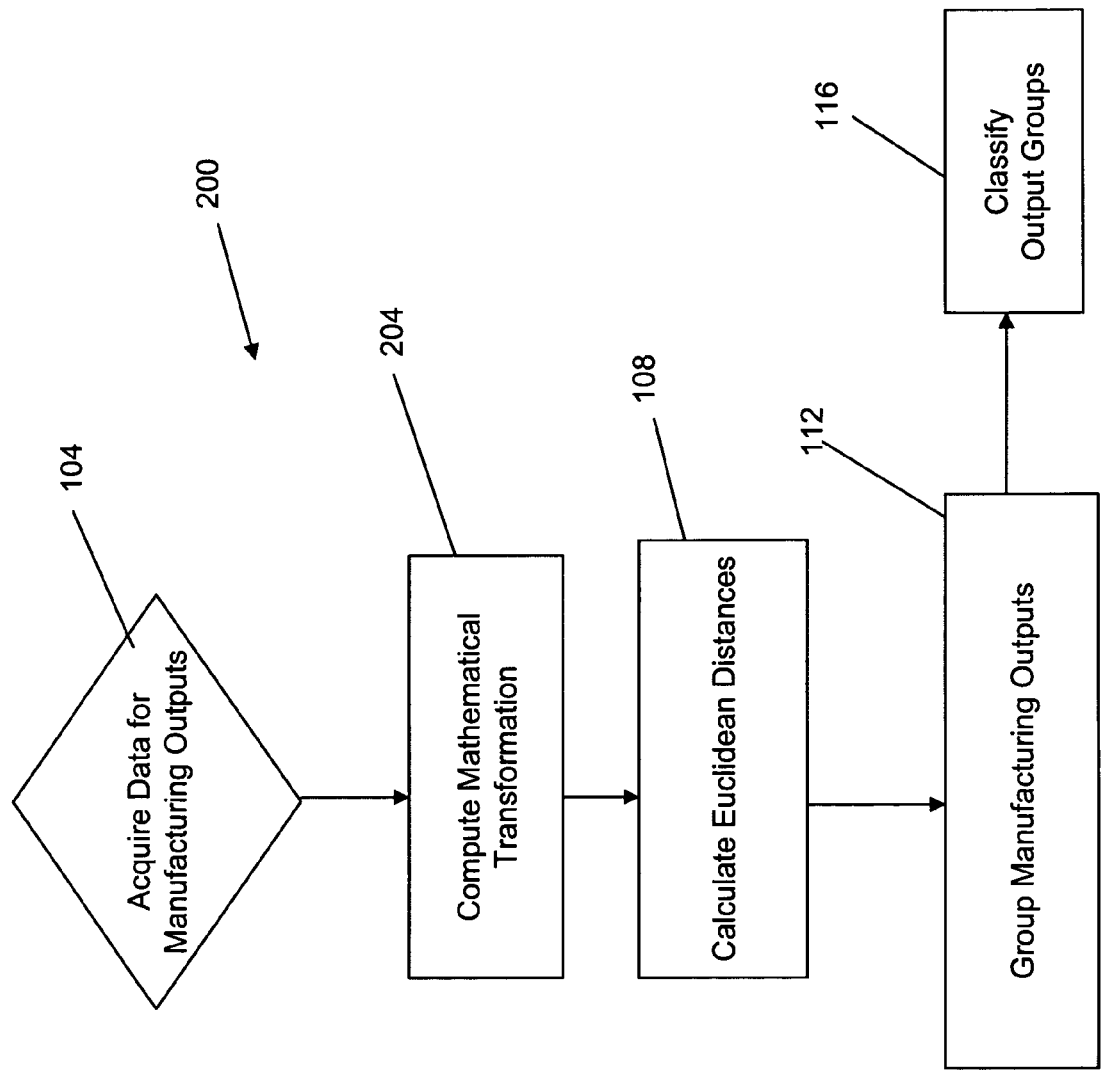
FIG. 2 is a flow diagram of a method for process monitoring and grouping outputs of the process, according to an illustrative embodiment of the invention.

FIG. 2 is a flow diagram 200 of a method for process monitoring. The method involves acquiring data samples (step 104) associated with a plurality of manufacturing related variables for a plurality of outputs of a manufacturing process. In this embodiment of the invention, the method also involves computing mathematical transformations (step 204) of the data samples acquired for each output. In this manner, the number of dimensions (variables) of the original data (acquired in step 104) is reduced down to smaller number of independent variables.

A suitable mathematical transformation method is the Principal Component Analysis (PCA) method. By way of example, this method may be implemented by using the SIMCA-P+ multivariate analysis software package (Umetrics, offices in Kinnelon, N.J.). The PCA method involves formatting in a matrix X (see EQN. 5) the data acquired (step 104), where the matrix X has N rows and K columns. K is the number of manufacturing related variables (e.g., residual gas analysis spectra measurements) and N is the number of data samples (e.g., observations or number of wafers) of the manufacturing process.

$$X = \begin{bmatrix} 1 & \cdots & \cdots & \cdots & K \\ \cdots & \cdots & \cdots & \cdots & \cdots \\ \cdots & \cdots & \cdots & \cdots & \cdots \\ \cdots & \cdots & \cdots & \cdots & \cdots \\ N & \cdots & \cdots & \cdots & \cdots \end{bmatrix} \quad \text{EQN. 5}$$

The mathematical transformation method (step 204) then involves calculating the average and standard deviation for each column K of the matrix X. The method (step 204) then involves centering and scaling each column K of the matrix X. The average of each column is subtracted from each entry in the corresponding column of the matrix X (centering). Each entry in the matrix X is then divided by the standard deviation of the corresponding column of the matrix X (scaling).

The Principal Component Analysis (PCA) method then involves reducing the number of dimensions (K variables) of the original data (original matrix X) down to a few independent variables that are a linear combination of the original data (K variables of original matrix X).

In one embodiment, the method (step 204) then involves determining the principal components and loadings of the data using an non-linear iterative partial least squares (NIPALS) method, as given by the following equation:

$$X = TP' + E \quad \text{EQN. 6}$$

where T is the scores matrix, P is the loading matrix, P' is the transpose of the P matrix, and E is the residual matrix. The scores matrix T is given by:

$$T = \begin{pmatrix} t_{1,1} & t_{2,1} & t_{3,1} & \cdots & t_{A,1} \\ t_{1,2} & t_{2,2} & t_{3,2} & \cdots & t_{A,2} \\ t_{1,3} & t_{2,3} & t_{3,3} & \cdots & t_{A,3} \\ \vdots & \vdots & \vdots & \ddots & \vdots \\ t_{1,N} & t_{2,N} & t_{3,N} & \cdots & t_{A,N} \end{pmatrix} \quad \text{EQN. 7}$$

and the loading matrix P is given by:

$$P = \begin{pmatrix} p_{1,1} & p_{2,1} & p_{3,1} & \cdots & p_{A,1} \\ p_{1,2} & p_{2,2} & p_{3,2} & \cdots & p_{A,2} \\ p_{1,3} & p_{2,3} & p_{3,3} & \cdots & p_{A,3} \\ \vdots & \vdots & \vdots & \ddots & \vdots \\ p_{1,k} & p_{2,k} & p_{3,k} & \cdots & p_{A,k} \end{pmatrix} \quad \text{EQN. 8}$$

where, for example, $t_{1,1}$ is the 1$^{st}$ component of the first principal component and $p_{1,5}$ is the load component for the 5$^{th}$ parameter in the 1$^{st}$ load vector. Each row of the T matrix [i.e., $(t_{1,1}, t_{2,1}, t_{3,1}, \ldots, t_{A,1})$] is the score vector for the corresponding observation from the data (X) matrix. By way of example, the third row of the T matrix is the score vector for the third data observation. Each score is a linear combination of all the actual measured parameters. The subscript A is the total number of principal components corresponding to the original data matrix X (see EQN. 5). The subscript k is the total number of measured parameters (data samples) in the original data matrix X.

The NIPALS method then involves iteratively employing the following equations:

$$p_1' = \frac{t_1' X}{t_1' t_1} \quad \text{EQN. 9}$$

where starting with an initial condition for the $t_1$ vector initially equal to the column of the X matrix (EQN. 5) having the maximum variance.

The NIPALS method then involves normalizing $p_1$ as follows:

$$\|p_1\| = 1.0 \quad \text{EQN. 10}$$

and then employing the following equation:

$$t_1 = \frac{X p_1}{p_1' p_1} \quad \text{EQN. 11}$$

The calculations of EQNS. 9-11 are then repeated until the calculations converge. By way of example, a user may specify (based on user experience) that the calculations have converged when $$\frac{\|t_1 - t_{1 old}\|}{\|t_1\|} < 10^{-6} \quad \text{EQN. 12}$$

where $t_{1 old}$ is the value of $t_1$ from the prior iteration of performing the calculations using EQNS. 9-11.

The residual matrix E is then determined from the following relationship:

$$E = X - t_1 p_1' \quad \text{EQN. 13}$$

The residual matrix E is then used in place of matrix X in EQNS. 9 and 11 to calculate the second principal component ($t_2$) and the second load vector ($p_2$). The steps associated with EQNS. 9-13 are then similarly performed for each additional principal component ($t_A$). The methods described herein are applicable to applications involving multiple numbers of principal components. The process described can be implemented when there is missing data when the following correction is used:

Let $c_{ik} = 1$ if $x_{ik}$ is defined. Let $c_{ik} = 0$ if $x_{ik}$ is missing. Then $$t_i = \frac{\sum_k c_{ik} x_{ik} p_k}{\sum_k c_{ik} p_k^2} \quad \text{EQN. 14}$$

$$p_k = \frac{\sum_i c_{ik} x_{ik} t_i}{\sum_i c_{ik} t_i^2} \quad \text{EQN. 15}$$

The next step then involves calculating the distances (step 108) of each data sample relative to every other data sample based on the principal component coordinates.

The next step in the flow diagram 200 involves grouping the data samples (step 112) based on the distances that satisfy a boundary determining criterion, similarly as previously described herein. The boundary determining criterion can involve grouping those data samples that are located within a predefined distance relative to each other.

The next step in the flow diagram 200 involves associating a classification (step 116) with one or more of the groups defined in step 112. The classification can be a desirable or undesirable trait or feature of the manufacturing output. In some embodiments, an operator may associate an arbitrary classification (e.g., Class A) with a group. An operator might do this where the classification type is initially unknown (e.g., set as Class A as a placeholder) and will be subsequently defined based on metrology measurements made after a batch of the manufacturing outputs are completely processed.

By way of illustration, an experiment was conducted to classify outputs of a semiconductor wafer manufacturing process. In this experiment, 217 wafers were output by the manufacturing process. Nineteen (19) manufacturing parameters were acquired once per second during each of four (4) different process steps used to fabricate the wafers. EQN. 5 was used to format the manufacturing data, the matrix X has K=19 columns (corresponding to 19 manufacturing parameters) and N has approximately 22,000 rows (for 217 wafers, sampled once per second for approximately 100 seconds per wafer).

Using a method similar to the Principal Component Analysis method described previously herein, the data matrix X was transformed to produce for each wafer a principal component location in a nine (9) dimensional phase space defined by ($t_1$, $t_2$, $t_3$, $t_4$, $t_5$, $t_6$, $t_7$, $t_8$, $t_9$).

EQN. 1 was then used to calculate the Euclidean distances of each point in phase space (each of the 217 wafers) relative to every other point in phase space (each of the 217 wafers). The wafers located within a distance of 5.0 of each other were grouped together and designated as a class.

Variations, modifications, and other implementations of what is described herein will occur to those of ordinary skill in the art without departing from the spirit and the scope of the invention and are considered to be encompassed thereby. Accordingly, the invention is not to be defined only by the preceding illustrative description.

What is claimed is:

1. A method for process monitoring, comprising:
   a) acquiring data samples associated with a plurality of manufacturing related variables for outputs of a manufacturing process;
   b) calculating the distance of each data sample relative to every other data sample; and
   c) grouping outputs based on the distances that satisfy a boundary determining criterion.

2. The method of claim 1 wherein the distance is selected from the group consisting of Euclidean distance, Mahalanobis distance and Manhattan distance.

3. The method of claim 1 wherein the boundary determining criterion comprises grouping data samples located within a predefined distance relative to each other.

4. The method of claim 1, comprising associating a classification with a group.

5. The method of claim 4 wherein the classification is a manufacturing defect.

6. The method of claim 1, comprising plotting the plurality of data samples as points in a phase space.

7. The method of claim 6 wherein calculating the distance comprises calculating the Euclidean distance of each point in phase space relative to every other point in phase space.

8. The method of claim 1 wherein the plurality of manufacturing related variables is one or more states of the manufacturing process.

9. The method of claim 1, comprising computing mathematical transformations of the data samples acquired for each output.

10. The method of claim 1 wherein computing mathematical transformations comprises computing principal components and loadings associated with the data samples acquired for each output.

11. The method of claim 9, comprising calculating the Euclidean distance of each data sample from every other data sample based on the mathematical transformations.

12. The method of claim 1 wherein the outputs of the manufacturing process are wafers produced by a semiconductor manufacturing process.

13. The method of claim 1 wherein the boundary defining criterion is selected by a user.

14. The method of claim 3 wherein the predefined distance is based on an analytical, experimental, or empirical model.

15. The method of claim 1, comprising identifying classification of outputs of a manufacturing process based on the Euclidean distance of a data sample relative to the groups.

16. The method of claim 1, comprising further grouping the groups based on whether the groups have common characteristics.

17. The method of claim 1, comprising developing a model for predicting output class of a new manufacturing output based on calculating the Euclidean distance of the data samples of the new manufacturing output relative to the groups.

18. The method of claim 1, comprising modifying the boundary determining criterion based on new manufacturing outputs.

19. A method for semiconductor process monitoring, comprising:
   a) acquiring data samples associated with a plurality of manufacturing related variables for outputs of a semiconductor manufacturing process;
   b) calculating the distance of each data sample relative to every other data sample; and
   c) grouping outputs based on the distances that satisfy a boundary determining criterion.

20. A system for process monitoring, comprising:
   a) means for acquiring data samples associated with a plurality of manufacturing related variables for outputs of a manufacturing process;
   b) means for calculating the distance of each data sample relative to every other data sample; and
   c) means for grouping outputs based on the distances that satisfy a boundary determining criterion.

* * * * *